(12) United States Patent
Kane et al.

(10) Patent No.: US 6,509,694 B1
(45) Date of Patent: Jan. 21, 2003

(54) DIMMABLE ILLUMINATION MODULE FOR PROJECTION SYSTEMS USING A HIGH-INTENSITY DISCHARGE LAMP VIA POLARIZATION MANIPULATION

(75) Inventors: Robert H. Kane, Ho-Ho-Kus, NJ (US); Steven J. Kane, Chester, NH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 09/930,347

(22) Filed: Aug. 15, 2001

(51) Int. Cl.[7] .............................................. H05B 37/00
(52) U.S. Cl. ..................................... 315/169.3; 353/20
(58) Field of Search .................... 315/169.3, DIG. 4; 353/20, 31

(56) References Cited

U.S. PATENT DOCUMENTS 6,309,071 B1 * 10/2001 Huang et al. .................. 353/31

\* cited by examiner

Primary Examiner—David Vu

(57) ABSTRACT

An external electronically controlled illumination module utilizing polarizing beam splitters to split the light beam from a projection lamp into two polarization states, selectively altering the state of each polarized light beam to reject a controlled portion of the light where the selectively altered beams are recombined and passed to the projection system optics.

12 Claims, 1 Drawing Sheet

DIMMABLE ILLUMINATION MODULE FOR PROJECTION SYSTEMS USING A HIGH-INTENSITY DISCHARGE LAMP VIA POLARIZATION MANIPULATION

TECHNICAL FIELD

The present invention relates generally to an illumination control for a projection display system and, more particularly, to a projection system illumination module for controlling the intensity of light from a discharge lamp through controlling polarization of the light beam.

BACKGROUND TECHNOLOGY

In many projection display systems, a discharge lamp is used as the preferable light source. During operation it sometimes becomes desirable, or necessary, to control the intensity of the light from the discharge lamp in order to reduce the screen brightness, or to control the illumination level in response to reductions in the video output to improve the apparent contrast ratio of the system in dark or black scenes. Various attempts have been made to incorporate light intensity controls for discharge lamps by the use of devices inside the projector. However, such "within the projector" systems have not yet been perfected to be satisfactory in the control of the intensity of lights from a discharge lamp, especially a high-pressure mercury discharge lamp which is a preferred light source for projection display systems. Some attempts to utilize a "within the projector" system have been found to have a deleterious effect on the uniformity of the light distribution to the display device which limits the possible physical location of such a system within the projector. Other "within the projector" systems require motors or actuators which may not be able to respond quickly enough to changes in video signals, especially when dynamic dimming is desired. In addition, such systems absorb input radiation and become hot. Accordingly, these "within the projector" control system require careful thermal designs and are limited by such thermal requirements.

The present invention is directed to overcoming one or more of the problems or disadvantages associated with the relevant technology.

SUMMARY OF THE INVENTION

In the preferred embodiment of this invention, the light intensity is controlled outside of the projection system optics by means of an electronically controlled illumination module that may be used with any projection system. Such a system does not require motors or actuators to operate and, accordingly, is able to respond quickly to changes in the video signal if dynamic dimming is desired. In addition, the illumination module of this invention will not absorb input radiation and, therefore, is not subjected to thermal changes which can effect reliable operation, especially for static dimming.

By positioning the illumination module of this invention outside the projection system optics, the illumination module may be used to control the intensity of light with any projection system, and eliminates any potential thermal problems occasioned by overheating components. Because the illumination module control of the present invention is completely electronic, response time to video signal level changes is extremely short, so that the illumination control system can respond quickly if dynamic dimming is desired.

The illumination module of the present invention has no mechanical elements and no moving parts, but utilizes a polarizing beam splitter to split the light beam from the projection lamp into two polarization states, selectively altering the state of each polarized light beam to reject a controlled portion of the light before the selectively altered beams are recombined and passed to the display projection optics. This system is especially effective for controlling dynamic dimming.

BRIEF DESCRIPTION OF THE DRAWINGS

In the accompanying drawing, one embodiment of the invention is illustrated splitting the light beam from a discharge lamp source into "p" and "s" linear polarization states at the splitting element, with each beam fraction subsequently passing through a separate liquid crystal (LC) rotator actuator. The polarization states are independently rotated by the LC devices and the separate beams are recombined at a second polarizing beamsplitter element. The degree of polarization rotation by the LC cells determines the fraction of light allowed by that element to pass to the projector optics.

BEST MODE FOR CARRYING OUT THE INVENTION

Figure 1:
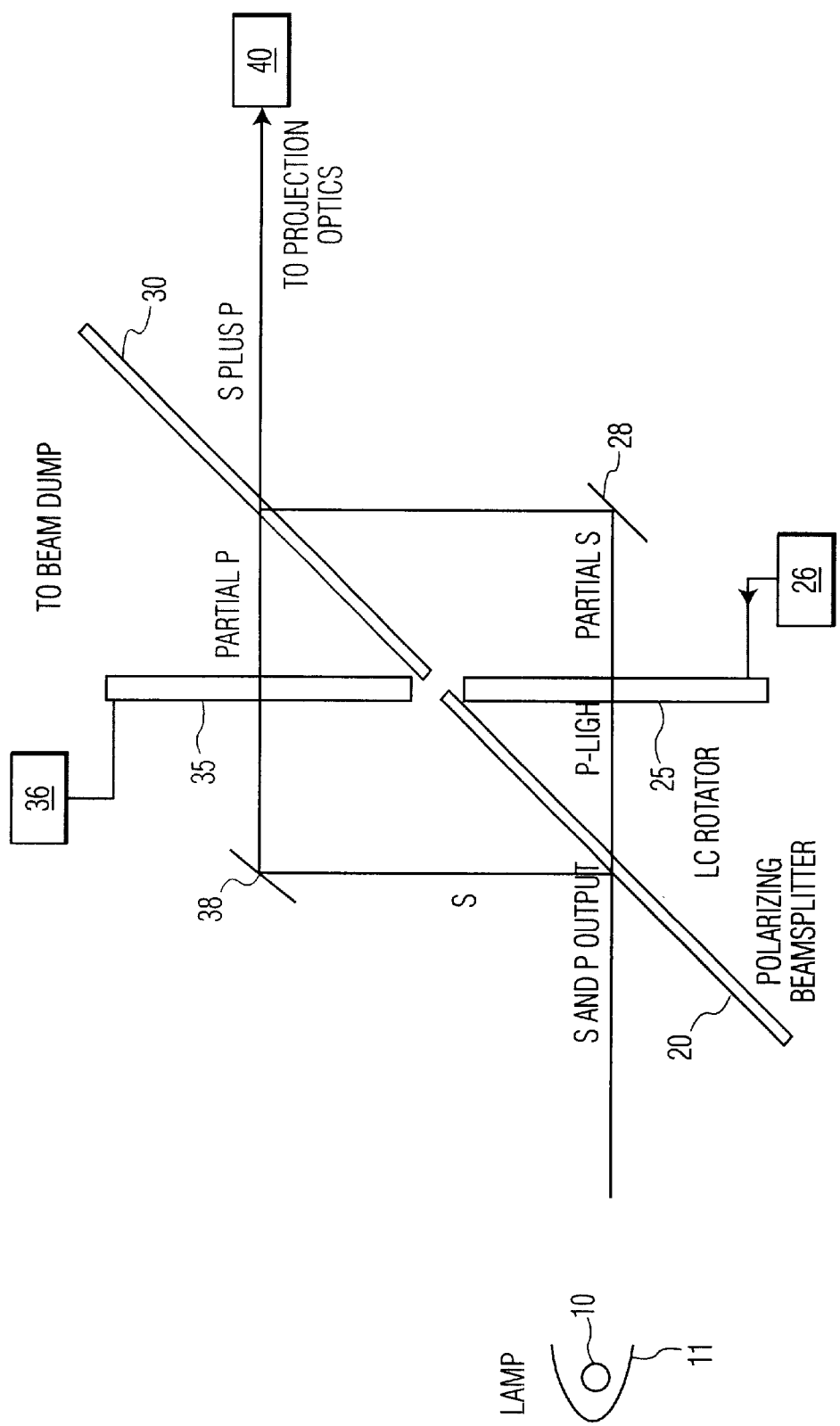

Referring now to the drawing, the following is a description of the preferred embodiment of the invention wherein a discharge lamp 10, preferably a short-arc high pressure mercury discharge lamp, is positioned in a parabolic reflector 11 to produce a nominally parallel beam of light. The beam of light so produced passes through a first polarizing beam splitter(PBS) 20 which splits the light beam with approximately half the light (p-state) being transmitted through the polarizing beam splitter 20 and the remainder (approximately half, less minor optical losses), the orthogonal polarization state (s state), being reflected. In all the following it is understood that "s" and "p" refer to the polarization states at the active surfaces of the PBS elements.

The direct beam (original p state) passes through an electronically controlled liquid crystal (LC) rotator 25, such as is available from Meadowlark Optics, P.O. Box 1000, 5964 Iris Parkway, Frederick, Colo. 80530 which in response to an applied voltage, rotates the plane of polarization to alter the ratio of s to p light in the beam, referred to the axes of the PBS elements. This rotation can be in response to either an applied voltage from a dimming control circuit 26 or from some other input measurement of the video level.

The original p state light now rotated by LC rotator 25 is then reflected by a first turning mirror 28 to a second PBS 30 which reflects orthogonally the fraction of local s light to the projector optics 40 and transmits the fraction of local p light to a beam dump and is lost to the system. With no rotation by LC rotator 20 there would be no local s fraction at the second PBS 30 and all the light from the original p-state fraction would be dumped. If the polarization state is rotated 90 degrees by LC rotator 20 then all the light incident on PBS 30 is s-state light and will be reflected to the projector optics 40 (less minor optical losses inherent in practical PBS elements).

The s-state light orthogonally reflected by the first PBS 20 is reflected by a second turning mirror 38 through a second similar electronically controlled liquid crystal (LC) rotator 35 which in response to an applied voltage rotates the plane of polarization in response to either an applied voltage from a dimming control 26 or some other input which is a measurement of some aspect(s) of the video signal to rotate the plane of polarization by a desired amount. The fraction of light which is now of s polarization state at the active surface of PBS 30 is reflected orthogonally to the beam dump while the fraction of p polarization state at the active surface of PBS 30 is transmitted to projector optics 40.

Functional Description

By arranging the system components in the manner illustrated in FIG. 1, each light path undergoes the same losses on reflection at the turning mirrors 28 and 38. At full brightness each LC rotator 25,35 must rotate the polarization state by 90 degrees since the other PBS is best designed to reflect the local s component and transmits the local p component of the polarization state. Dimming is effected when pre-described voltages are applied to the LC rotators 25,35, either manually for static dimming or overall level of control, or dynamically in response to variations in the video signal level applied to each of the rotators by their associated control circuits 26 and 36, respectively. In addition, the characteristics of the LC rotators 25, 35 may be different in each light path. Such a difference in characteristics may be desirable because the degree of polarization rotation is wave-length dependent. For example, it may be preferable to optimize one of the LC rotators for a wave length slightly shorter than optimum green, while the other LC rotator is optimized for a wave-length slightly longer.

When the system is to be utilized for dimming control, the requirements of the PBS components are not stringent because high-contrast ratio (s to p rejection) is not important. Therefore, a modulation depth of 20 to 50 percent, for example, is believed to be suitable. Accordingly, suitable PBS coatings or structures on thin glass plates are believed to be acceptable and prisms are not believed to be required for many applications.

The system illustrated in FIG. 1 may also be constructed as a monolith of cemented prisms. With the liquid crystal rotators 25, 35 being sandwiched between the separation and re-combination PBS modules 20, 30. The illumination control system may also be constructed as a fluid-filled tank to increase the overall dimming ratio by improving the performance of the PBS coatings. In this manner it is possible to reduce the infrared transmission to the projection optics by absorption, an important consideration when using very high power sources.

Other aspects and features of the present invention can be obtained from a study of the drawings, the disclosure, and the appended claims.

What is claimed is:

1. An illumination control module for controlling the intensity of light applied to a projection system, comprising:

a first polarizing beam splitter positionable in a light path of nominally parallel light beams;

said first polarizing beam splitter transmitting light of a first p-state therethrough in a p-state light path, and reflecting light of a second s-state therefrom in an s-state light path;

a first liquid crystal polarization rotator positioned in said p-state light path;

said first liquid crystal polarization rotator operable to control the amount of p-state light passing therethrough in response to a control signal coupled thereto;

a second liquid crystal polarization rotator positioned in said s-state light path;

said second liquid crystal polarization rotator operable to control the amount of the s-state light passing therethrough in response to a control signal coupled thereto;

a control signal source coupled to said first and second liquid crystal polarization rotators to rotate the polarization state thereof, in response to a control signal received thereby; and a second polarizing beam splitter positioned in said p-state light path and said s-state light path for transmitting the s-state light therethrough and reflecting the p-state light therefrom in a combined controlled optical path to a projection system.

2. The illumination control module of claim 1 wherein said control signal source provides a control signal in response to changes in a video signal.

3. The illumination control module of claim 1 wherein said control signal source provides a control signal in response to a voltage change from a dimming control circuit.

4. The illumination control module of claim 1 wherein said control signal source comprises, a first control signal source coupled to said first liquid crystal polarization rotator, and a second control signal source coupled to said second liquid crystal polarization rotator.

5. The illumination control module of claim 1 wherein said first liquid crystal polarization rotator and said second liquid crystal polarization rotator are mutually exclusively tuned to different wave lengths.

6. The illumination control module of claim 1 wherein at least one of said first or second polarization beam splitters is formed as a polarizing beam splitting coating on a glass plate.

7. The illumination control module of claim 1 wherein said first and second liquid crystal rotators are sandwiched between said first and second polarizing beam splitters as a monolith of cemented prisms.

8. The illumination control module of claim 1 further including a fluid-filled tank in which said illumination control module is submerged.

9. The illumination control module of claim 1 wherein said first polarizing beam splitter reflects said s-state light in a s-state light path orthogonal to said p-state light path, said second polarization beam splitter reflects said p-state light in a light path orthogonal to said p-state light path, and said second polarization beam splitter reflects said p-state light in a light path parallel to said s-state light transmitted therethrough.

10. A method of controlling the illumination of a projection system, comprising the steps of:

directing a normally parallel beam of light to a first polarizing beam splitter;

transmitting a first p-state light beam through said first polarizing beam splitter in a p-state light optical path;

reflecting a second s-state light beam from said first polarizing beam splitter in an s-state light optical path;

passing said p-state light transmitted through said first polarizing beam splitter through a first liquid crystal rotator operable to control the amount of p-state light passing therethrough in response to a control signal coupled to said first liquid crystal rotator;

passing said s-state light reflected from said first polarizing beam splitter through a second liquid crystal rotator operable to control the amount of s-state light passing therethrough in response to a control signal coupled to said second liquid crystal rotator;

generating a control signal to said first and second liquid crystal polarization rotators to determine the respective amount p-state and s-state light passed therethrough in response to changes in a video signal; and passing said controlled p-state and s-state light to a second polarizing beam splitter for recombining said controlled p-state and s-state light in a combined light controlled optical path.

11. The method of controlling the illumination of the projection system of claim 10 wherein the step of generating a control signal to said first and second liquid crystal polarization rotator includes coupling a first voltage signal from a dimming control circuit to said first liquid crystal polarization rotator and coupling a second voltage signal from a dimming control circuit to said second liquid crystal polarization rotator.

12. The method of controlling the illumination of the projection system of claim 10 further including mutually exclusively optimizing said first liquid crystal polarization rotator and said second liquid crystal polarization rotator for different wave lengths.

* * * * *